United States Patent
de Geus et al.

(10) Patent No.: US 7,448,490 B2
(45) Date of Patent: Nov. 11, 2008

(54) CONVEYING SYSTEM WITH A SLIDE-OVER DEVICE BETWEEN TWO BELT CONVEYORS, SLIDE-OVER DEVICE AND INTERMEDIATE ELEMENT WITH A SLIDE-OVER SURFACE

(75) Inventors: Sjoerd de Geus, Delft (NL); Gijsbertus Johannes Verduijn, Terheijden (NL)

(73) Assignee: MCC Nederland B.V., Gravenzande (NL)

( * ) Notice: Subject to any disclaimer, the term of this patent is extended or adjusted under 35 U.S.C. 154(b) by 0 days.

(21) Appl. No.: 11/923,797

(22) Filed: Oct. 25, 2007

(65) Prior Publication Data
US 2008/0047805 A1 Feb. 28, 2008

Related U.S. Application Data

(63) Continuation of application No. 10/520,740, filed as application No. PCT/NL03/00504 on Jul. 9, 2003, now Pat. No. 7,314,130.

(30) Foreign Application Priority Data
Jul. 9, 2002 (NL) .................................. 1021038

(51) Int. Cl.
*B65G 47/74* (2006.01)
(52) U.S. Cl. ...................... 198/635; 198/600
(58) Field of Classification Search ............... 198/600, 198/635, 850, 853
See application file for complete search history.

(56) References Cited

U.S. PATENT DOCUMENTS

| | | | |
|---|---|---|---|
| 3,870,141 A | 3/1975 | Lapeyre et al. | |
| 4,958,726 A | 9/1990 | Fett et al. | |
| 5,322,158 A | 6/1994 | Borsboom et al. | |
| 5,597,063 A | 1/1997 | Bogle et al. | |
| 5,634,550 A | 6/1997 | Ensch et al. | |
| 5,678,682 A | 10/1997 | van Zijderveld | |
| 5,816,389 A | 10/1998 | van Zijderveld | |

(Continued)

FOREIGN PATENT DOCUMENTS

DE 2508275 A 9/1976

(Continued)

OTHER PUBLICATIONS

International Search Report Under Date of Mailing of Nov. 14, 2003, in connection with International Patent Application No. PCT/NL2003/00504.

*Primary Examiner*—James R Bidwell
(74) *Attorney, Agent, or Firm*—Quarles & Brady LLP

(57) ABSTRACT

A conveying system comprising an endless first conveyor belt circulating between at least first and second divert elements, a top run of the first conveyor belt forming a first conveying surface movable between the divert elements in a first conveying direction, and an endless second conveyor belt circulating between at least third and fourth divert elements, the top run of the second conveyor belt forming a movable second conveying surface movable between the divert elements in a second conveying direction, the second conveyor belt extending at least partly above and along the second divert element, so that the first and second conveyor belts, while including a gap-shaped interspace, are in mutually transverse alignment. In the interspace, intermediate elements, in particular fingers, are arranged that bridge the gap between the first and the second conveying surface.

7 Claims, 2 Drawing Sheets

U.S. PATENT DOCUMENTS

| | | |
|---|---|---|
| 5,850,902 A | 12/1998 | Hicks et al. |
| 6,138,819 A | 10/2000 | Bogle et al. |
| 6,296,110 B1 | 10/2001 | van Zijderveld et al. |
| 7,314,130 B2 * | 1/2008 | de Geus et al. ............. 198/635 |

FOREIGN PATENT DOCUMENTS

| | | |
|---|---|---|
| DE | 2604705 A | 8/1977 |
| DE | 8700878 U | 3/1987 |
| DE | 19632376 | 2/1998 |
| EP | 0700843 A1 | 3/1996 |
| EP | 0722896 A1 | 7/1996 |
| EP | 0930254 A | 7/1999 |
| WO | 00/13993 | 3/2000 |

* cited by examiner

CONVEYING SYSTEM WITH A SLIDE-OVER DEVICE BETWEEN TWO BELT CONVEYORS, SLIDE-OVER DEVICE AND INTERMEDIATE ELEMENT WITH A SLIDE-OVER SURFACE

CROSS REFERENCE TO THE RELATED APPLICATION

This application is a continuation of U.S. patent application Ser. No. 10/520,740 filed on Jun. 14, 2006 now U.S. Pat. No. 7,314,130, which claims priority to PCT/NL03/00504 filed on Jul. 9, 2003, which claims priority to Dutch Patent Application No. 1021038 filed in Jul. 9, 2002.

STATEMENT REGARDING FEDERALLY SPONSORED RESEARCH

Not Applicable.

BACKGROUND OF THE INVENTION

This invention relates to a conveying system, comprising an endless first conveyor-belt circulating between at least first and second divert elements, a top run of the first conveyor belt forming a first conveying surface movable between the divert elements in a first conveying direction, and an endless second conveyor belt circulating between at least third and fourth divert elements, a top run of the second conveyor belt forming a second conveying surface movable between the divert elements in a second conveying direction, the top run of the second conveyor belt extending at least partly above and along the second divert element, so that the first and second conveyor belts, while including a gap-shaped interspace, are in mutually transverse alignment. Such a conveying system is known from EP 0 722 896.

Conveying systems of the type mentioned in the opening paragraph hereof are generally known and are used for conveying products in, for instance, the packaging and food industries. The conveyor belts of these systems can be designed, for instance, as rubber mats or metal mesh belts, but also as modular mats or chains from metal and/or plastic. The divert elements can then be designed, for instance, as pulleys, but also, for instance, as single or multiple chain wheels. In conveying systems, often a number of conveyor belts are connected in succession.

At places where products are to be conveyed to or from the conveying surface, as at right-angled and in-line transitions between conveyor belts and at processing stations, slide-over devices are used. An example of such a slide-over device is a slide-over plate with fingers that cooperate with grooves formed in the surface of a conveyor belt.

The conveying systems are increasingly used to convey small batches of products. Preferably, the conveying systems are then designed such that the conveying system is self-clearing, without human intervention. A drawback of the slide-over plates, also called finger plates or combs, is that at the end of a production run, the last products remain behind on the slide-over plates.

To mitigate this disadvantage, the conveying system mentioned in the opening paragraph hereof has been developed. What can be achieved owing to the top run of the second conveyor belt extending at least partly above and alongside the second divert element, is that the conveying surfaces link up without an intervening "dead" area. To make the gap-shaped interspace as small as possible, the longitudinal edge of the second conveyor belt facing the first conveyor belt is provided with a bevel.

A drawback of the conveying system mentioned in the opening paragraph hereof is that where less stable products are involved, the interspace between the first and the second conveyor belt may be too large, so that the products may fall over. The longitudinal edge of the second conveyor belt then forms, as it were, a bumper. A further disadvantage is that the longitudinal edge mentioned is susceptible to damage resulting from products butting against the edge.

SUMMARY OF THE INVENTION

The object of the invention is to provide a conveying system of the type mentioned in the opening paragraph hereof, by which the disadvantages mentioned can be avoided. To that end, the conveying system according to the invention is characterized in that in the interspace at least one intermediate element is arranged which bridges the gap between the first and the second conveying surface. By the use of an intermediate element, the longitudinal edge of the second conveyor belt can be protected, while furthermore the falling over of products can be prevented. The intermediate element can be manufactured from material that is less sensitive to wear than the conveyor belt and can, for instance, be replaced as a loose unit.

The intermediate elements can for instance be provided with a substantially horizontally oriented supporting surface which forms a slide-over surface that is arranged in the entry of the gap-shaped space.

The intermediate elements preferably comprise fingers extending preferably in uniformly spaced-apart relation, parallel to the conveying direction of the first conveyor belt. Back parts of the fingers form a comb-shaped part of the slide-over surface at the entry of the gap between the first conveying surface and the second conveying surface. With the aid of such a comb-shaped slide-over surface, not only can products be supported during slide-over, but also the entry of larger dirt entities into the gap can be prevented, while smaller dirt entities can be discharged between the fingers via the gap. This is specifically important with modular mats, since in the case of such mats the gap size between the first and the second conveyor varies. In such a modular conveying mat, the mat, when passing around the chain wheel, forms a rotating polygon whose angular points may jam dirt entities in the gap. Especially in the case of modular mats from plastic material, where abrasive pollutions, such as glass frits, may get stuck, considerable damages may be prevented by the comb formed by the fingers.

The slide-over surface may then be built up from a substantially closed part of the supporting surface, with the comb-shaped part contiguous thereto.

Naturally, the slide-over surface can also be made of fully comb-shaped or fully closed design. In the case of a fully comb-shaped slide-over surface, the intermediate elements can be formed by loose fingers.

The fingers can be made, for instance, of bar-shaped design and may optionally be provided with a plate-shaped supporting part of substantially upstanding orientation. Naturally, the fingers and the supporting part may be integrated to form a single component.

In the event of damage to the fingers, the fingers can be replaced individually or in groups, while the longitudinal edge of the conveyor belt remains intact.

A further advantage is that the fingers can cooperate with grooves in the surface of the first conveyor belt, extending in the conveying direction. The fingers are provided with a first back part which extends from the second conveying surface into the first conveying surface. In this way, the products can be readily moved from the first conveying surface onto the slide-over surface. Furthermore, in a similar manner, any larger fouling entities can be taken from the first conveying surface, and be discharged via the slide-over surface. Also, as a consequence, the intermediate elements can optionally be supported on the first conveying surface. The grooves in the surface of the conveying mat can for instance be formed by slots in a substantially flat surface of the conveyor belt, but may also be formed, for instance, between upstanding ribs on the surface of the conveyor belt. The walls and the bottom of the grooves may be staggered or even be locally interrupted.

It will be clear that in such an arrangement the slide-over surface formed by the backs of the fingers overlap with the first conveying surface. Furthermore, it will be clear that the non-overlapping part of the slide-over surface forms a stationary, "dead" area. To prevent the possibility of products remaining behind on this slide-over surface when the conveyor belt is running empty, the length of the slide-over surface between the first conveying surface and the second conveying surface in a first conveying direction is preferably made smaller than the minimum dimension of the base of the product to be conveyed.

It will furthermore be clear that the system can be traversed with products in two directions. In the case of 'ascending' conveyance, the products are slid over from the first conveying surface via the slide-over surface to the second conveying surface. In the case of 'descending' conveyance, this order is reversed.

By providing the longitudinal edge of the second conveyor belt facing the first conveyor belt with a bevel, the width of the gap can be reduced. Such a bevel constitutes a reduction and can have a substantially straight configuration, but can naturally also have a different configuration, such as a concave configuration, a convex configuration or a combined configuration.

Preferably, the intermediate elements, in particular the fingers, are provided with a further back part which is situated lower with respect to the slide-over surface formed by the first back part, and which is formed to correspond to the bevel of the longitudinal edge of the second conveyor belt. What can thus be achieved is that the intermediate elements can link up very closely with the longitudinal edge of the second conveyor belt.

In an advantageous embodiment, the intermediate elements, in particular the fingers, reach under the top run of the second conveyor belt. What can thus be achieved is that the intermediate elements can, for instance, be secured on a supporting frame of the second conveyor belt. In a particularly elegant design, the intermediate elements support the top run of the second conveyor belt. What can be achieved by guiding the second conveyor belt over a lower portion of the intermediate elements is that alignment of the second conveying surface relative to the slide-over surface in a height direction is not necessary.

It is noted that the slide-over surface, the first conveying surface and the second conveying surface do not need to be situated at the same height. Preferably, however, the surfaces referred to are situated substantially at the same height. To effect proper removal of products from the slide-over surface in the case of ascending conveyance, i.e., from the first belt to the second belt, the slide-over surface can be chosen to be slightly lower than the first conveying surface and the second conveying surface. The slide-over surface then forms, for instance, a pit which is lowered relative to the second conveying surface and the first conveying surface. Also, the slide-over surface can form steps with the first and second conveying surface. In case of descending conveyance, i.e. from the second belt to the first belt, this relation can be the other way around.

In a further advantageous embodiment fingers are groupwise connected with a central carrier. In that case, the central carrier together with the fingers can be replaced as a unit. Also, the fingers may be connected to the central carrier such that they are each separately detachable. The fingers can then be secured to a support, directly or by way of a central carrier. What can thus be achieved is that a finger can be replaced as a separate unit.

Advantageously, the fingers can be provided with a breaking point in that, for instance, the surface area of the cross section is locally smaller than at adjacent parts of the finger. What can thus be achieved is that in case of any overloading or damage, the finger breaks off in a predefined manner which does not impede the functioning of the conveying system.

In a further advantageous embodiment, the intermediate elements, in particular the fingers, are arranged so as to be movable transversely to the conveying direction of the first conveyor belt. What can thus be achieved is that any variation in width of the conveyor belt as a result of temperature change during operation can be accommodated. This is specifically important in the case of wide modular conveying mats from plastic material, such as conveying mats that are used in tunnel pasteurizers, heaters or coolers. The fingers may then be arranged so as to be slidable each separately or in groups, for instance by slidably connecting the fingers directly or via a central carrier with a support.

The invention further relates to a slide-over device, comprising a central carrier with a number of substantially parallel extending fingers, back parts of which form a comb-shaped part of a slide-over surface, the slide-over device being further provided with an endless conveyor belt circulating between at least two divert elements, a top run of the endless conveyor belt forming a conveying surface movable between the divert elements in a conveying direction, which conveying surface is substantially contiguous to the slide-over surface. The slide-over surface can then be fully comb-shaped, so that the backs of the fingers link up directly with the conveying surface, but it may also link up with the conveying surface by way of a closed part. Preferably, the fingers extend substantially transversely to the conveying direction of the conveyor belt.

The invention furthermore relates to a finger for use in the above-mentioned conveying system or slide-over device.

Further advantageous embodiments of the invention are represented in the description of the drawings and in the dependent claims.

BRIEF DESCRIPTION OF THE DRAWINGS

The invention will be further elucidated on the basis of an exemplary embodiment which is represented in a drawing. In the drawing.

It is noted that the figures merely involve a schematic representation of a preferred embodiment of the invention and should merely be construed as a non-limiting exemplary embodiment. In the figures, the same or corresponding parts are designated with the same reference numerals.

DETAILED DESCRIPTION OF A PREFERRED EMBODIMENT OF THE INVENTION

Figure 1:
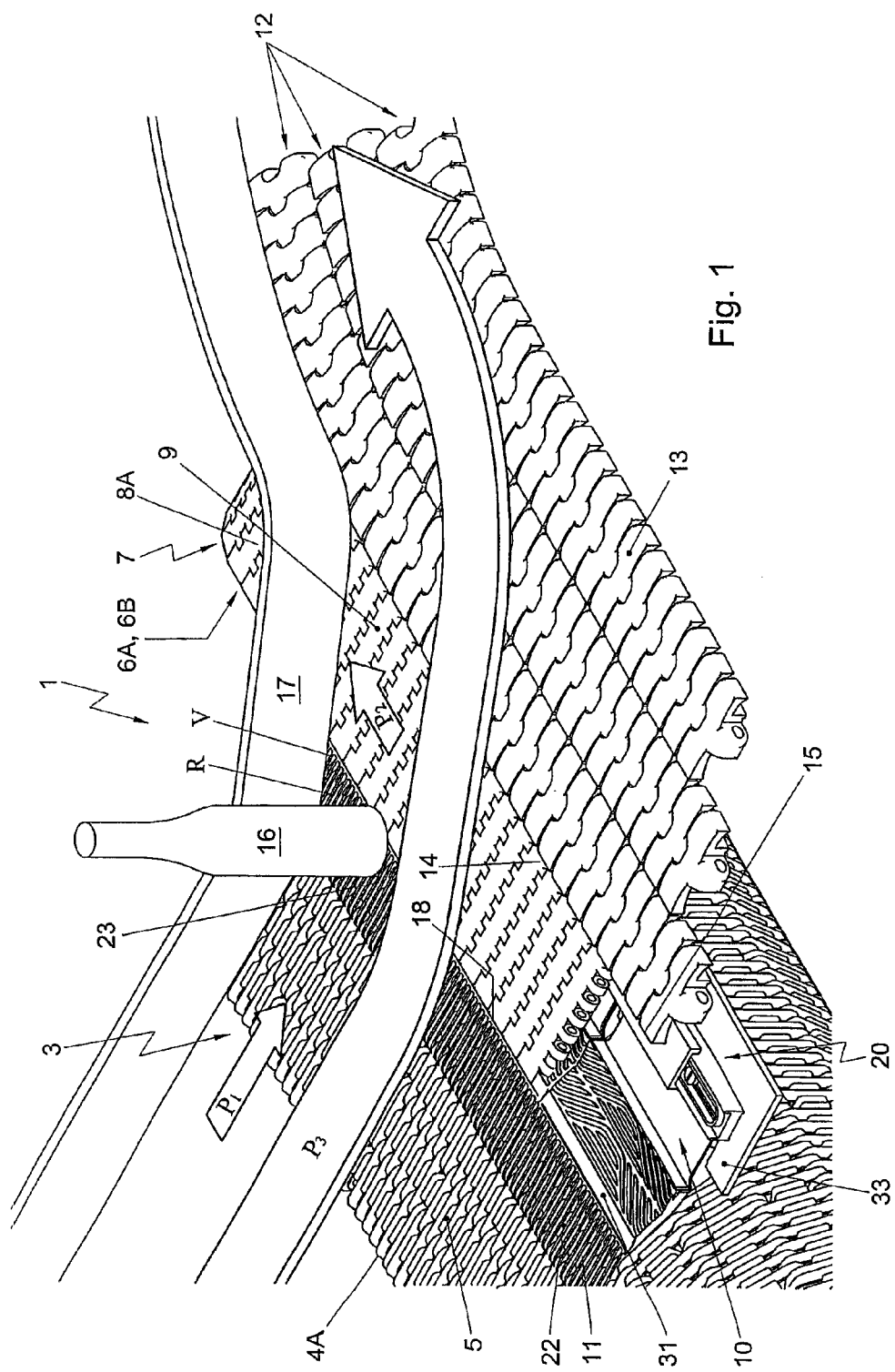
FIG. 1 shows a schematic perspective view of a conveying system according to the invention.
Figure 2:
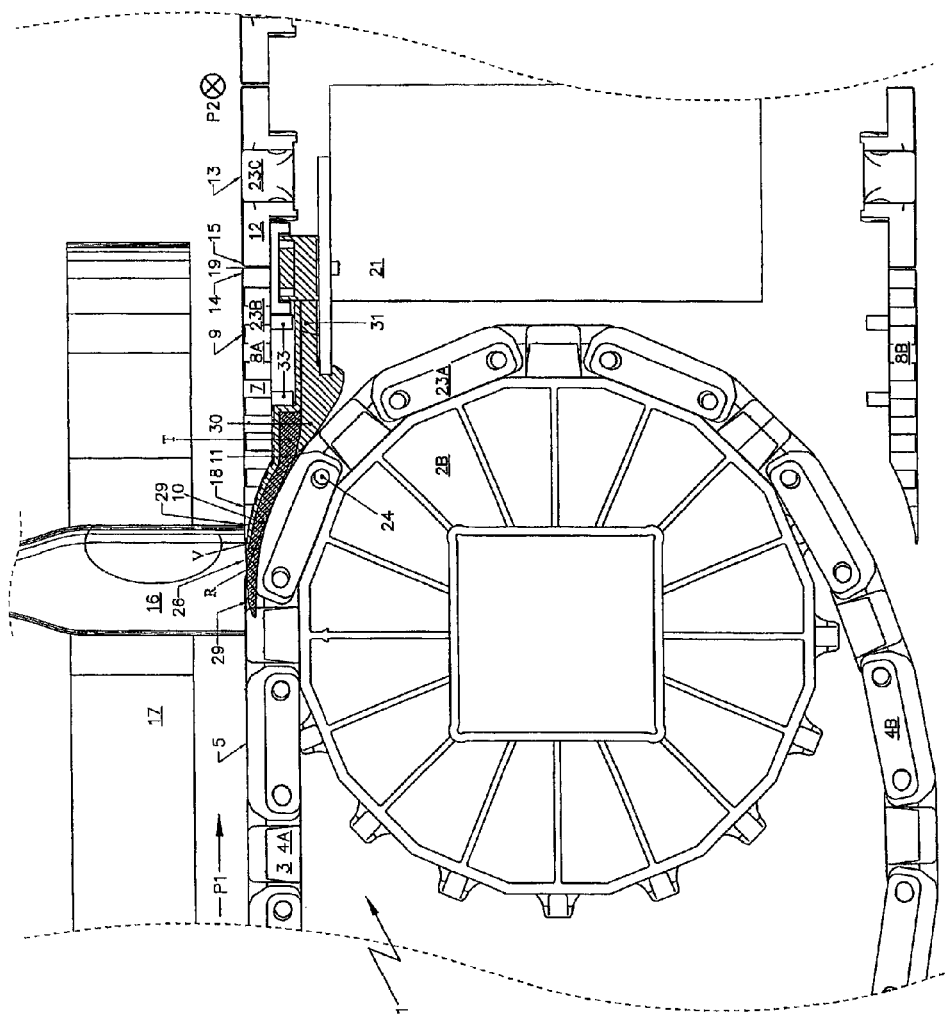
FIG. 2 shows a schematic cross section of the conveying system of FIG. 1.

Referring to FIGS. 1 and 2, there is shown a conveying system 1. The conveying system 1 comprises an endless conveyor belt 3 circulating between first divert wheels 2A (not shown) and second divert wheels 2B. The first conveyor belt 3 comprises a top run 4A and a bottom run 4B. The top run 4A forms a first conveying surface 5 movable between the first and second divert wheels in a first conveying direction represented by arrow P1. The conveying system 1 further comprises an endless second conveyor belt 7 circulating between third divert wheels 6A (not shown) and fourth divert wheels 6B (not shown). The second conveyor belt 7 comprises a top run 8A and a bottom run 8B. The top run 8A forms a second conveying surface 9, movable between the third and fourth divert wheels in a second conveying direction indicated by the arrow P2. The top run 8A of the second conveyor belt 7 extends at least partly above and alongside the second divert wheels 2B. In particular, the top run 8A of the second conveyor belt 7 extends at least partly above and along a downwardly extending quadrant aligning with the first conveying surface 5, of the second divert element formed by the second divert wheels 2B.

The first conveyor belt 3 and the second conveyor belt 7 are in transverse mutual alignment, thereby including a gap-shaped interspace 10. Arranged in the interspace 10 are intermediate elements T, comprising fingers 11, which bridge the gap 10 between the first conveying surface 5 and the second conveying surface 9. The intermediate elements T are of comb-shaped design and comprise a central carrier 31 with fingers 11. The central carrier 31 defines a substantially flat, closed part V of the slide-over surface, while the back parts of the fingers form a comb-shaped part R of the slide-over surface.

In this exemplary embodiment, the conveying system 1 further comprises a third endless conveyor belt 12, which circulates between fifth and sixth divert wheels, not shown. The third conveyor belt 12 runs parallel to the second conveyor belt 7, while the third conveying surface 13 formed by the top run of the third conveyor belt 12 is situated substantially in the same plane as the second conveying surface 9. The third conveying surface 13 moves between the fifth and the sixth divert wheels, preferably in the same direction as the second conveying surface 9, that is, in the second conveying direction indicated by arrow P2. The second conveyor belt 7 and the third conveyor belt 12 bound each other by their longitudinal edges 14 and 15, respectively.

A product 16, in this exemplary embodiment a bottle, moves along the path indicated by the arrow P3 over the conveying path formed by the conveyor belts 3, 7 and 12. The products 16 are supplied in the first conveying direction P1 and are moved along a guide 17 from the first conveying surface 5, via the comb-shaped part R of the slide-over surface 22 formed by the back parts 26 of the fingers 11, and the closed part V of the slide-over surface 22 formed by the central carrier, onto the second conveying surface 9. By the use of the fingers 11, the longitudinal edge 18 of the second conveyor belt 7 is protected, while further the falling over of products 16 is prevented. To avoid the possibility that products, when the conveyor path is running empty, remain standing on the slide-over surface 22, the length of the slide-over surface 22 between the first conveying surface 5 and the second conveying surface 9, viewed in the first conveying direction, that is, in the direction of arrow P1, has been chosen to be less than the minimum dimension of the base 23 of a product 16 to be conveyed. Optionally, any products that remain standing on the slide-over surface 22 can be pushed on in a mechanical manner, for instance with an arm or with a vibrating device.

Upon arrival at the second conveying surface 9, the products 16 are moved further via the guide 17 onto the third conveying surface 13 of the third conveyor belt 12. Because the second conveyor belt 7 and the third conveyor belt 12 run in the same direction, the gap-shaped interspace 10 included between the second conveyor belt 7 and the third conveyor belt 12 can be very narrow, thus avoiding problems of damage to the longitudinal edge 15 and products falling over.

It is noted that the comb-shaped part R of the slide-over surface 22 may link up directly with the second conveying surface 9. The central carrier 31 or the finger 11 may then continue under the second conveying surface 9; in that case, the closed part V of the slide-over surface 22 is not present.

For the sake of good order, it is further noted that the third conveyor belt 12 as such is not requisite. If desired, just a second conveyor belt 7 will suffice. Optionally, the second conveyor belt 7 can be designed to have a large width transversely to the second conveying direction P2.

However, the fingers 11 and the second conveyor belt 7 may be part of a slide-over device 20 which is placed in-between the first conveyor belt 3 and the third conveyor belt 12. This can provide the advantage that the first and third conveyor belts can each have their own track construction and that the slide-over device 20 is supported independently. In the exemplary embodiment represented here, however, the slide-over device 20 is supported on the frame 21 of the third conveyor belt 12.

The slide-over device 20 can also be applied between a first conveyor belt 3 and a third conveyor belt 12 whose conveying directions are equally directed. In the case of such a tail-end transition between the conveyors, the slide-over device 20 can be placed between the two conveyor belts, so that the second conveyor belt 7 has one extreme longitudinal edge 18 extending above and along the second chain wheels 2B of the first conveyor and has another extreme longitudinal edge 14 extending above and along the fifth chain wheels of the third conveyor belt. For the sake of good order, it is noted here that the second conveyor belt may be built up from a number of parallel conveyor belts, such as a number of chain tracks running next to each other. Naturally, also the first and the third conveyor belts can be built up from several parallel belts whose top runs in each case jointly form a conveying surface.

In the following, a few constructional details of the exemplary embodiment represented here will be further elucidated.

The first conveyor belt 3 is designed as a modular conveying mat which is built up from a number of successive modules 23A in conveying direction P1, which have been coupled through hinge pins 24. Transversely to the conveying direction P1, the mat is built up from a number of juxtaposed rows of modules 23A which have been coupled according to a brick pattern by the hinge pins 24 extending throughout width of the mat. The construction of such a modular conveying mat is known to those skilled in the art, for instance from U.S. Pat. No. 3,870,141 or WO 00/13993.

The second conveyor belt 7 is here likewise designed as a modular conveying mat from plastic material. This modular conveying mat is built up from just a single row of successive modules 23B in the second conveying direction P2, coupled by means of hinge pins (not shown). The longitudinal edge 15 proximal to the first conveyor belt 3 is provided with a bevel to make the gap-shaped interspace 10 between the first conveyor belt 3 and the second conveyor belt 7 as small as possible. Such a beveled conveying mat is known, for instance, from EP 0 722 896. It is noted that the bevel may also be built up from separate modules which are secured to longitudinal edges of the individual modules 23.

The third conveyor belt 12 is built up from a number of parallel tracks of modular chain. Each chain track is built up from a number of successive modules 23C in conveying direction P2, coupled by hinge pins. The hinge pins couple only the successive modules of a chain track, so that the juxtaposed tracks of the chain are not coupled. Such a modular chain is known to those skilled in the art and is described inter alia in EP 0 344 411 or EP 0 700 843.

The fingers 11 are plate-shaped and extend next to each other, upstanding, equidistantly spaced, parallel to the first conveying direction P1. Back parts 26 of the fingers 11 form a comb-shaped slide-over surface 22 at the entry 27 of the gap 10.

The fingers 11 cooperate with grooves 28 extending in conveying direction P1 in the surface of the first conveyor belt 7. The slide-over surface 22 formed by the back parts 26 of the fingers 11 overlaps the first conveying surface 5: the fingers 11 reach into the first conveying surface 5. The fingers 11 are provided with a further back part which has been formed to correspond to the bevel 29 of the longitudinal edge 18 of the second conveyor belt 7 facing the first conveying mat. By way of their plate-shaped supporting parts 30, the fingers 11 reach under the top run 8A of the second conveyor belt 7. The fingers support the top run 8A of the second conveyor belt 7 and form a guide 32 for the guiding projections 33 (shown in FIG. 2) of the modules 23B of the top run 8A of the second conveyor belt 7. The first conveying surface 5, the second conveying surface 9 and the slide-over surface 22 are situated substantially at the same level. As shown, the slide-over surface 22 can be chosen to be just slightly lower than the second conveying surface 9, which in turn is situated just slightly lower than the first conveying surface 5. The fingers 11 are here each non-detachably connected with a central carrier 31. The fingers 11 are connected to the frame 21 by way of the central carrier 31, such that they are slidable transversely to the conveying direction P1 of the first conveyor belt 3, that is, in the conveying direction P2 of the second conveyor belt 7. To that end, the central carrier 31 is supported on a support 33 (shown in FIG. 1) arranged on the track frame 21 of the third conveyor belt 12, but, as stated, may also be supported by an independent frame. Naturally, the fingers can also be supported on the track frame of the first conveyor belt 3. Accordingly, the slide-over device can be supported on the track frame of the first and/or the second conveyor belt and may further be supported on a frame of its own.

It is noted that the individual fingers can be differently designed, and the interspace between the successive fingers can be different, for instance when the pattern of grooves in the first conveyor belt 3 has been chosen to be of a design with alternating interspaces or of an irregular design. Also, a supporting surface formed by the intermediate elements can be designed as a slide-over plate which may or may not be provided with apertures or grooves, which is arranged in the entry of the gap-shaped interspace.

Furthermore, instead of being designed as a modular conveying mat, a conveyor belt can also be manufactured in one piece.

In addition, both the first and the second conveyor belt can circulate between more than two divert elements. For instance, the second conveyor belt can circulate in a rectangle, passing around four divert elements, while optionally a further divert element may be used to tension the belt.

It will be clear that the invention is not limited to the embodiment described here. It will be clear to those skilled in the art that many variations are possible within the scope of the invention as set forth in the following claims.

We claim:

1. An intermediate element for a conveying system, said conveying system including a first conveyor belt having a first conveying surface moving in a first conveying direction and a second conveyor belt having a second conveying surface moving in a second conveying direction substantially transverse to said first conveying direction, said intermediate element comprising:
    a first back part forming a slide-over surface on which a product being conveyed slides from the first conveyor belt to the second conveyor belt; and
    a second back part is lower with respect to the slide-over surface and is formed to extend under the second conveyor belt;
    wherein the first back part extends, at least in part, into the first conveyor belt and the second back part supports the second conveyor belt to form the slide-over surface extending from the first conveying surface to the second conveying surface such as to span a gap between the first conveying surface and the second conveying surface.

2. The intermediate element as in claim 1, in which said first back part includes a plurality of fingers extending away from said second back part to form a comb-shaped part of the slide-over surface.

3. The intermediate element as in claim 1, in which said second back part is formed to correspond to a longitudinal edge of the second conveyor belt.

4. The intermediate element as in claim 2, wherein said fingers are provided with a breaking point.

5. The intermediate element as in claim 1, in which said first back part forms a comb-shaped slide-over surface.

6. The intermediate element as in claim 1, including a central carrier non-detachably connected to said fingers for connecting said fingers to a frame.

7. A conveying system comprising:
    a first conveyor belt;
    a second conveyor belt; and
    an intermediate element as in claim 1, wherein a product being conveyed slides from the first conveyor belt to the second conveyor belt, and said second back part of said intermediate element extends under the second conveyor belt.

* * * * *